(12) United States Patent
Kato et al.

(10) Patent No.: US 9,739,303 B2
(45) Date of Patent: Aug. 22, 2017

(54) MAIN BEARING FOR CRANKSHAFT OF INTERNAL COMBUSTION ENGINE

(71) Applicant: Daido Metal Company Ltd., Nagoya (JP)

(72) Inventors: Kenta Kato, Inuyama (JP); Yuki Kawashima, Inuyama (JP)

(73) Assignee: DAIDO METAL COMPANY LTD., Nagoya-shi (JP)

( * ) Notice: Subject to any disclaimer, the term of this patent is extended or adjusted under 35 U.S.C. 154(b) by 0 days.

(21) Appl. No.: 15/017,993

(22) Filed: Feb. 8, 2016

(65) Prior Publication Data
US 2016/0230806 A1    Aug. 11, 2016

(30) Foreign Application Priority Data

Feb. 9, 2015  (JP) ................................. 2015-023068

(51) Int. Cl.
*F16C 33/10*    (2006.01)
*F16C 9/02*     (2006.01)
(Continued)

(52) U.S. Cl.
CPC ............ *F16C 9/02* (2013.01); *F16C 33/1065* (2013.01); *F16C 17/022* (2013.01); *F16C 33/046* (2013.01);
(Continued)

(58) Field of Classification Search
CPC ........ F16C 9/02; F16C 17/022; F16C 33/046; F16C 33/1065; F16C 2360/22; F16C 9/04
See application file for complete search history.

(56) References Cited

U.S. PATENT DOCUMENTS 8,297,845 B2 * 10/2012 Maitani ..................... F16C 9/00
                                                         384/288
8,905,639 B2 * 12/2014 Ishigo ....................... F16C 9/02
                                                         384/288
(Continued)

FOREIGN PATENT DOCUMENTS

DE         69102094 T2    9/1994
DE       102010036283 A1  4/2011
(Continued)

OTHER PUBLICATIONS

Extended European Search Report issued Jul. 5, 2016 in corresponding European application No. EP 16154454.9.

*Primary Examiner* — James Pilkington
(74) *Attorney, Agent, or Firm* — Harness, Dickey & Pierce, P.L.C.

(57) ABSTRACT

A main bearing includes first and second half bearings, each having a main cylinder portion and crush relief portions in both circumferential end portions. An oil groove circumferentially extends on an inner circumferential surface only of the first half bearing, one circumferential end portion of the oil groove opens on a circumferential end surface on a front side in a rotation direction, and the other circumferential end portion of the oil groove is positioned in the crush relief portion on a rear side in the rotation direction. The first half bearing includes a transition region between the crush relief portion on the front side in the rotation direction and the main cylinder portion, and the second half bearing includes a transition region between the crush relief portion on the rear side in the rotation direction and the main cylinder portion.

9 Claims, 9 Drawing Sheets

(51) Int. Cl.
*F16C 17/02* (2006.01)
*F16C 33/04* (2006.01)

(52) U.S. Cl.
CPC ...... *F16C 33/1075* (2013.01); *F16C 2360/22* (2013.01)

(56) References Cited

U.S. PATENT DOCUMENTS

| | | | | |
|---|---|---|---|---|
| 8,961,018 | B2* | 2/2015 | Kawashima | F16C 9/04 384/288 |
| 8,979,379 | B1* | 3/2015 | Kawashima | F16C 9/02 384/288 |
| 9,004,767 | B2* | 4/2015 | Ishigo | F16C 9/04 384/291 |
| 2010/0046869 | A1 | 2/2010 | Matsuyama | |

FOREIGN PATENT DOCUMENTS

| | | |
|---|---|---|
| DE | 102013203128 A1 | 8/2013 |
| DE | 102013204592 A1 | 9/2013 |
| EP | 2618011 A2 | 7/2013 |
| EP | 2703662 A1 | 3/2014 |
| JP | 08-277831 | 10/1996 |
| JP | 2008-95858 | 4/2008 |
| JP | 2011-58568 | 3/2011 |

* cited by examiner

MAIN BEARING FOR CRANKSHAFT OF INTERNAL COMBUSTION ENGINE

BACKGROUND OF THE INVENTION (1) Field of the Invention

The invention of the present application relates to a main bearing for supporting a crankshaft of an internal combustion engine.

(2) Description of Related Art

A crankshaft of an internal combustion engine is supported at a journal section thereof by a cylinder block lower part of the internal combustion engine via a main bearing made of a pair of half bearings. For the main bearing, a lubricating oil that is discharged by an oil pump is fed into a lubricating oil groove that is formed along an inner circumferential surface of the main bearing through a through-port that is formed in a wall of the main bearing from an oil gallery that is formed in a cylinder block wall. Further, a first lubricating oil path is formed by being penetrated in a diameter direction of the journal section, and both end openings of the first lubricating oil path communicate with the lubricating oil groove of the main bearing. Furthermore, a second lubricating oil path passing through a crank arm section is formed by branching from the first lubricating oil path in the journal section, and the second lubricating oil path communicates with a third lubricating oil path that is formed by being penetrated in a diameter direction of a crankpin. In this manner, the lubricating oil which is fed into the lubricating oil groove formed on the inner circumferential surface of the main bearing through the through-port from the oil gallery in the cylinder block wall passes through the first lubricating oil path, the second lubricating oil path and the third lubricating oil path, and is supplied between a sliding surface of the crankpin and a connecting rod bearing from a discharge port that is opened in a terminal end of the third lubricating oil path (for example, see JP-A-8-277831).

The lubricating oil which is fed to the lubricating oil groove of the main bearing from the oil gallery in the cylinder block wall is likely to be accompanied by residual foreign matters that are generated at a time of machining of respective components, for example. The foreign matters are likely to damage sliding surfaces between the journal section and the main bearing and sliding surfaces between the crankpin and the connecting rod bearing, and therefore, need to be discharged to an outside quickly from the flow of the lubricating oil.

Consequently, there has been conventionally provided a main bearing for supporting a crankshaft of an internal combustion engine, wherein an inner circumferential surface of each of semi-cylindrical bearings that configure the main bearing is formed of two kinds of circular arcs with different curvatures, namely, a first curved surface (a main cylinder portion) including a circumferential central portion and a second curved surface (a crush relief portion), an axial groove is formed through an entire length in a width direction of both butting end surfaces of the semi-cylindrical bearings, the second curved surface is formed in a range of 20° to 50° as a circumferential angle (θ) measured from a circumferential end surface of each of the semi-cylindrical bearings, and a number of fine circumferential grooves are formed in the second curved surface (FIGS. 1 and 5 of JP-A-2011-58568), so that foreign matters that accompany the lubricating oil and enter a lubricating oil groove of one of the semi-cylindrical bearings are fed to and dispersed in a gap formed by the second curved surface and a surface of the crankshaft, are thereafter discharged to an outside of the main bearing from the axial groove, and are prevented from reaching an inner circumferential surface position of the other semi-cylindrical bearing and being locally embedded and accumulated in the same inner circumferential surface (paragraph 0011 of JP-A-2011-58568).

Further, there has been proposed a sliding bearing in which one circumferential end portion of a lubricating oil groove formed along an inner circumferential surface of one of semi-cylindrical bearings constituting a main bearing communicates with a crush relief and a chamfer, and the other circumferential end portion does not communicate with a crush relief, for ensuring compatibility of reduction of the amount of a lubricating oil flowing out of an oil clearance of the bearing, and inhibition of occurrence of an damage due to a foreign matter (the abstract of JP-A-2008-95858).

However, a bearing gap between the inner circumferential surface (the first curved surface and the second curved surface) of a sliding bearing (half bearing) and a journal surface has been set to be narrow conventionally. For example, in the case of the main bearing disclosed in JP-A-2011-58568, the formation range of the second curved surface is set to be large possibly, namely, at 20° or more at a minimum toward the central potion side from the circumferential end surface of the half bearing, and the difference between a bearing wall thickness W1 in the circumferential central portion and a bearing wall thickness W2 at the circumferential end portion of a half bearing 10 is 5 to 30 μm. Therefore, the main bearing has the following problems.

(1) On an upstream side of the gap region, a gap between the second curved surface on a circumferential central portion side of the half bearing from the circumferential central portion of the second curved surface and the journal section surface of the crankshaft becomes too narrow with respect to the sizes of the foreign matters that enter the oil groove. Further, "the pressure of the oil which accompanies the journal surface and flows to the circumferential end portion side in the gap between the second curved surface and the journal surface>the pressure of the oil in the oil groove" is established, and the foreign matters are difficult to disperse while flowing to the gap between the second curved surface and the journal surface from the oil groove. Further, (a few of) foreign matters that are discharged into the gap are pushed into the second curved surface by the journal section surface of the crankshaft and accumulate.

(2) Further, in the formation range of the second curved surface, an increasing rate of the gap per unit circumferential angle toward the circumferential end portion side from the circumferential central portion side of the half bearing is small, and therefore, on a downstream side of the gap region, the oil with a high pressure in the gap between the second curved surface on the circumferential central portion side of the half bearing and the journal surface (namely, on an upstream side of the gap region) accompanies the journal surface and is fed to the gap between the second curved surface on the circumferential end portion side of the half bearing and the journal surface (namely, the downstream side of the gap region). Thereby, on the downstream side of the gap region, "the pressure of the oil which accompanies the journal surface and flows to the circumferential end portion side in the gap between the second curved surface and the journal surface>the pressure of the oil in the oil groove" also tends to be established. Consequently, as shown in FIG. 14A, among the foreign matters in the oil groove, only a few of foreign matters flow to the gap between the second curved surface on the circumferential end portion side of the half bearing and the surface of the journal section, and most of the foreign matters advance to the circumferential end portion side of the oil groove, and easily enter the inner circumferential surface of the other half bearing. Furthermore, by the pressure of the oil which accompanies the journal surface and flows to the circumferential end portion side in the gap between the second curved surface and the journal surface as described above, a few of foreign matters that flow out to the gap also pass over the axial groove and are easily forced to flow to the inner circumferential surface of the other half bearing, as shown in FIGS. 14A and 14B.

Also, the conventional sliding bearing disclosed in JP-A-2008-95858 has the above problem regarding discharge of the foreign matters. Further, since this conventional sliding bearing is configured so that one of the circumferential end portions of the lubricating oil groove does not communicate with the crush relief, a state where an opening of an inner oil path on a journal surface does not communicate with the lubrication oil groove is generated, and the amount of the lubricating oil tends to be insufficient in a circumferential end region of the lubricating oil groove on a rear side in a rotation direction of the crankshaft, so that supply of the lubricating oil toward a crankpin portion side becomes intermittent.

Meanwhile, if a partial groove communicating with the lubricating oil groove is formed in the other half bearing for constant oil supply toward the crankpin portion side as shown in FIG. 42 of JP-A-2008-95858, most of the foreign matters are forwarded to the other half bearing by being guided by the partial groove, and tend to concentrate and be accumulated on a sliding surface in front of the partial groove.

SUMMARY OF THE INVENTION

Accordingly, an object of the invention of the present application is to provide a main bearing for a crankshaft of an internal combustion engine that is excellent in foreign matter discharging efficiency, and in oil supply property toward the crankpin portion side.

In order to attain the above described object, according to one aspect of the invention of the present application, there is provided:

a main bearing for rotatably supporting a journal section of a crankshaft of an internal combustion engine, the journal section comprising a cylindrical body portion, a lubricating oil path extending to penetrate the cylindrical body portion, and at least one inlet opening of the lubricating oil path that is formed on an outer peripheral surface of the cylindrical body portion, wherein the first and second half bearings are configured so as to form together an axial groove extending through an entire length of the main bearing in an axial direction on an inner circumferential side of each butting portion when the first and second half bearings are combined, each half bearing has a main cylinder portion including a circumferential central portion of the half bearing, and crush relief portions which are formed throughout the entire lengths in the axial direction at both end portions of the half bearing in the circumferential direction in such a manner that a wall thickness of the crush relief portion becomes thinner than that of the main cylinder portion, and each crush relief portion extending from the circumferential end surface of the half bearing toward the circumferential central portion with a center angle not less than 3° but not more than 15°, a plurality of crush relief grooves extending in the circumferential direction through an entire length of the crush relief portion are formed in each crush relief portion so as to communicate with the axial grooves, an oil groove is formed only on an inner circumferential surface of the first one of the first and second half bearings to extend in the circumferential direction at least over the main cylinder portion of the first half bearing, a circumferential end portion of the oil groove on a front side of a rotation direction of the crankshaft opens on the circumferential end surface of the first half bearing on the front side of the rotation direction, a circumferential end portion of the oil groove on a rear side of the rotation direction of the crankshaft is located in the crush relief portion of the first half bearing on the rear side of the rotation direction, the first half bearing further has a transition region formed at least between the crush relief portion on a front side in a rotation direction of the crankshaft and the main cylinder portion in such a manner that a wall thickness of the transition region becomes thinner toward the crush relief portion from the main cylinder portion, the second half bearing further has a transition region formed at least between the crush relief portion on a rear side in a rotation direction of the crankshaft and the main cylinder portion in such a manner that a wall thickness of the transition region becomes thinner toward the crush relief portion from the main cylinder portion, and the transition region comprises an inward protruding curved surface in a protruding shape which protrudes inward in a radial direction, seen from the axial direction of the half bearing.

In the above described main bearing, each crush relief portion connecting to the transition region preferably has a depth of 0.002 mm to 0.030 mm in a radial direction in the connecting position.

Further, in the above described main bearing, each transition region preferably has a length of 1 mm to 4 mm in the circumferential direction.

Further, in the above described main bearing, each crush relief groove preferably has a depth of 1 μm to 20 μm in the radial direction, and a width of 0.05 mm to 0.5 mm in the axial direction.

Further, in the above described main bearing, when the first and second half bearings are combined, the respective crush relief grooves which are formed in the crush relief portions of the first half bearing are preferably adapted to be displaced in the axial direction with respect to the respective crush relief grooves which are formed in the crush relief portions of the second half bearing by an amount exceeding zero at a minimum and less than the width of the crush relief groove at a maximum.

Further, in the above described main bearing, each axial groove preferably has a depth of 0.1 mm to 1 mm in the radial direction, and a width of 0.3 mm to 2.0 mm in the circumferential direction.

Further, in the above described main bearing, the transition region may have the inward protruding curved surface on a side far from the crush relief portion, and may have an outward protruding curved surface in a protruding shape protruding outward in the radial direction on a side near the crush relief portion.

Further, in the above described main bearing, the depth of the oil groove may be maximum at the circumferential end surface of the first half bearing on the front side of the rotation direction, and may become smaller toward the circumferential end portion of the oil groove on the rear side of the rotation direction (FIG. 12).

Further, in the above described main bearing, a range obtained by combining a formation range of the oil groove of the first half bearing and a formation range of the crush relief portion of the second half bearing on the rear side of the rotation direction is from 180° to 190° as a circumferential angle (FIG. 15).

According to the invention of the present application, the transition region is formed between the crush relief portion and the main cylinder portion of at least one of the half bearings, and thereby, the end portion of the crush relief on the circumferential central portion side of the half bearing is deviated to the outside diameter side of the half bearing as compared with the conventional bearing.

Therefore, (A) in the upstream side region of the crush relief, a gap space in which a foreign matter FM in the oil groove is movable to the relief gap is formed in a vicinity of the connecting portion of the transition region 73 and the oil groove 41*a* (FIG. 10B), and (B) the oil in the relief gap between the journal section surface of the crankshaft and the crush relief surface also reduces in pressure in the upstream region. More specifically, when the oil that has a high pressure in the gap between the main cylindrical surface and the journal surface advances into the relief gap space of the invention of the present application that has a large gap volume (where the gap volume abruptly increases), the pressure of the oil abruptly reduces at the same time. Therefore, the foreign matters in the oil groove also disperse while especially flowing to the relief gap from a gap between the transition region and the journal surface together with the oil (FIG. 10A).

The foreign matters that disperse and flow into the relief gap are guided by recessed portions of the plurality of crush relief grooves 74 that form the crush relief surface, are fed to the axial groove 77 with which the crush relief grooves communicate on the circumferential end portion side of the half bearing, and are further discharged to the outside from the openings of both end portions of the axial grooves at both end portions in the axial direction of the main bearing.

In the invention of the present application, when the oil that has a high pressure in the gap between the main cylinder portion and the journal surface advances into the relief gap which has a large gap volume (the gap volume abruptly increases), the pressure of the oil abruptly reduces at the same time. Further, the oil flows that flow into the relief gap from the transition region 73 of FIG. 10A (the oil flows shown by the arrows) collide with the oil flow not illustrated that flows to the relief gap from the gap side between the main cylinder portion and the journal surface, accompanies the journal surface, and moves straight ahead in the circumferential direction of the bearing in such a manner as to intersect one another in the relief gap. Therefore, in the relief gap, the flow of the oil that flows in the circumferential direction of the bearing is weakened. As a result thereof, the foreign matters that flow out into the relief gap of the invention of the present application hardly causes a problem that the foreign matters pass over the axial groove by the pressure of the oil that accompanies the journal surface and flows toward the circumferential end portion side in the gap between the relief surface (the crush relief grooves) and the journal surface, and are forced to flow to the inner circumferential surface of the other half bearing.

Further, according to the invention of the present application, the formation range of the crush relief portion is from 3° to 15° inclusive as the circumferential angle (θ) starting from the circumferential end surface of the half bearing. The reason thereof is that if the formation range of the crush relief is less than 3° as the circumferential angle (θ) from the circumferential end surface of the half bearing, the foreign matters in the oil groove are difficult to disperse and flow out to the relief gap (the capacity of the relief gap is so small that when the oil which has a high pressure in the gap between the main cylinder portion and the journal surface advances into the gap space, the effect of reducing the pressure of the oil becomes insufficient), whereas if the circumferential angle (θ) exceeds 15°, the foreign matters pass over the axial groove and easily advance into the inner circumferential surface of the other half bearing.

In more detail, oil flows (oil flows shown by the arrows) that flow into the relief gap from the transition region in FIG. 10A collide with an oil flow that flows to the relief gap from a gap side between the main cylinder portion and the journal surface (not illustrated) accompanies the journal surface and moves straight ahead in the circumferential direction of the bearing in such a manner as to intersect one another in the relief gap. Therefore, in the relief gap, the flow of the oil which flows in the circumferential direction of the bearing is weakened. If the formation range of the crush relief exceeds a circumferential angle (θ) of 15°, the oil which is decreased in speed of straight movement in the circumferential direction on the upstream side of the relief gap increases in speed of straight movement in the circumferential direction of the bearing again in the vicinity of the circumferential end portion of the half bearing in the relief gap until the oil accompanies the journal surface, and is fed to the vicinity of the circumferential end portion of the half bearing in the relief gap, whereby the foreign matters pass over the axial groove and easily advances into the inner circumferential surface of the other half bearing.

Further, according to the invention, the second half bearing further includes a transition region formed at least between the crush relief portion on the rear side in the rotation direction of the crankshaft and the main cylinder portion so that a wall thickness of the transition region becomes thinner toward the crush relief portion from the main cylinder portion, and therefore a retaining capacity for the oil flowing from the oil groove of the first half bearing to a relief gap becomes large as compared to a relief gap formed by a conventional crush relief portion, so that the oil in the crush relief gap becomes forwarded toward the crankpin portion side also when the inlet opening of the inner oil path of the crankshaft communicates with this crush relief (as well as the oil groove of the first half bearing), which hardly causes the intermittent oil supply.

Further, the oil supplied from the oil groove of the first half bearing to a main cylinder surface of the second half bearing then enters a gap formed by the crush relief portion of the second half bearing on the front side in the rotation direction of the crankshaft and the crush relief portion of the first half bearing on the rear side in the rotation direction. Since the circumferential end portion of the oil groove on the rear side in the rotation direction of the crankshaft is located in the crush relief of the first half bearing on the rear side in the rotation direction, (a part of) the oil in the crush relief is forwarded into a region of the circumferential end portion of the oil groove on the rear side in the rotation direction by accompanying a surface of the rotating crankshaft (the dotted arrow shows a flow of the oil in FIGS. 13A and 13B), which prevents shortage of an oil amount in this region, and the oil is forwarded toward the crankpin portion side even during the inlet opening of the inner oil path of the crankshaft passes over this region.

Differently from the invention, if the circumferential end portion of the oil groove on the rear side in the rotation direction of the crankshaft is not located in the crush relief portion of the first half bearing but in the main cylinder portion, the oil supplied from the relief gap to the region of the circumferential end portion of the oil groove on the rear side in the rotation direction decreases, and therefore the oil amount is apt to be insufficient in the region of the circumferential end portion of the oil groove on the rear side in the rotation direction.

On the contrary, if the circumferential end portion of the oil groove on the rear side in the rotation direction of the crankshaft opens on the circumferential end surface of the first half bearing, the oil in the oil groove is likely to flow to the gap formed by the crush relief portion of the first half bearing on the rear side of the rotation direction of the crankshaft and the crush relief portion of the second half bearing on the front side in the rotation direction, and to the supplied from the relief gap to the region of the circumferential end portion of the oil groove on the rear side in the rotation direction decreases and to the axial groove formed on an inner circumferential side of the butting portion of the circumferential end portions of the first and second half bearings, and therefore will flow to the outside of the main bearing.

BRIEF DESCRIPTION OF THE DRAWING(S)

DETAILED DESCRIPTION OF THE INVENTION

Figure 1:
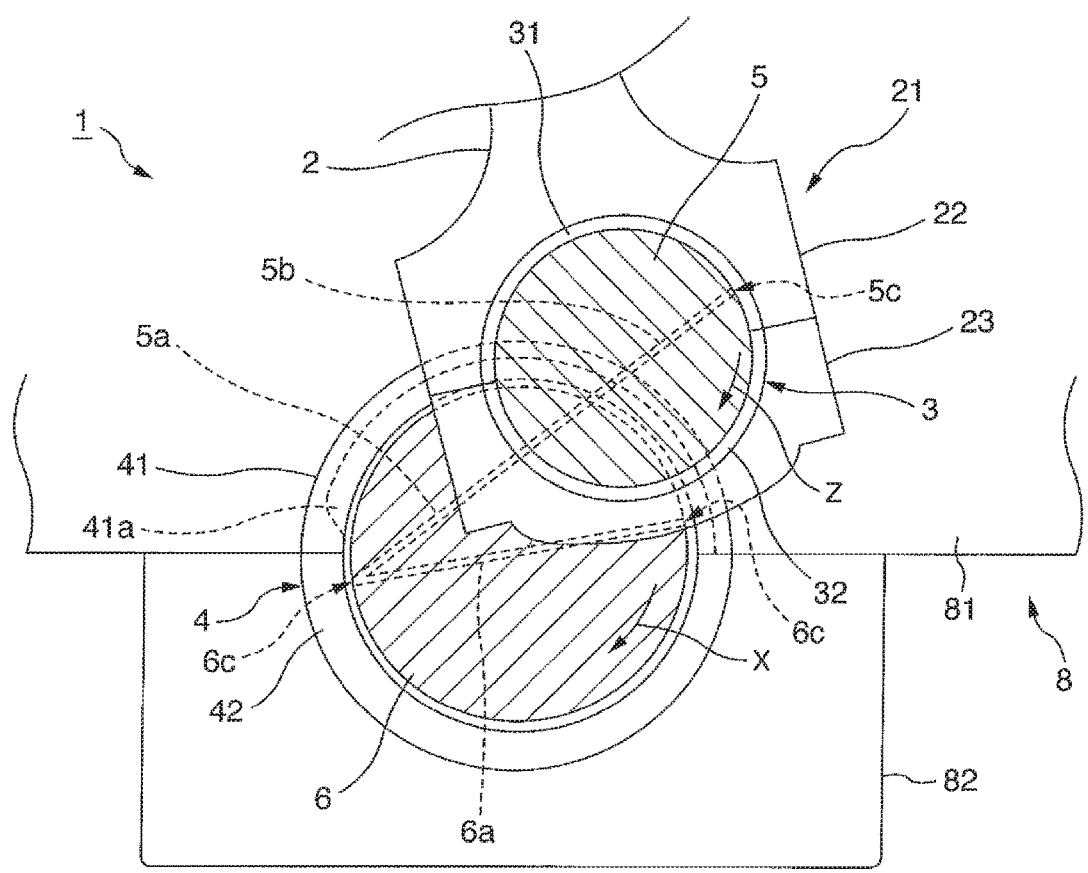
FIG. 1 is a sectional view of a crankshaft of an internal combustion engine cut at a journal section and a crankpin section.

Hereinafter, embodiments of the invention of the present application will be described with reference to the drawing. Note that in order to facilitate the understanding of the embodiments, crush reliefs are illustrated by being emphasized in the drawing.
(Entire Configuration of Bearing Device)

As shown in FIG. 1, a bearing device 1 of each of the present embodiments includes a journal section 6 that is supported by a lower part of a cylinder block 8, a crankpin 5 that is formed integrally with the journal section 6 and revolves around the journal section 6, and a connecting rod 2 that transmits reciprocal movement from an internal combustion engine to the crankpin 5. The bearing device 1 further includes a main bearing 4 that rotatably supports the journal section 6, and a connecting rod bearing 3 that rotatably supports the crankpin 5, as sliding bearings that support a crankshaft.

Note that while the crankshaft has a plurality of journal sections 6 and a plurality of crankpins 5, explanation will be made by illustrating one of the journal sections 6 and one of the crankpins 5 here for convenience of explanation. In FIG. 1, positional relation in a depth direction of the page is such that the journal section 6 is on a back side of the page, and the crankpin 5 is on a front side thereof.

The journal section 6 is pivotally supported by a cylinder block lower part 81 of an internal combustion engine via the main bearing 4 that is configured by a pair of half bearings 41 and 42. In the half bearing 41 which is on an upper side in FIG. 1, an oil groove 41a is formed on an inner circumferential surface in a circumferential direction. Further, the journal section 6 has a lubricating oil path 6a that penetrates in the diameter direction, and when the journal section 6 rotates in an arrow X direction, openings at both ends of the lubricating oil path 6a alternately communicate with the oil groove 41a of the main bearing 4.

The crankpin 5 is pivotally supported by a large end portion housing 21 (a rod side large end portion housing 22 and a cap side large end portion housing 23) of the connecting rod 2 via the connecting rod bearing 3 which is configured by a pair of half bearings 31 and 32.

As described above, for the main bearing 4, a lubricating oil that is discharged by an oil pump is fed into the oil groove 41a which is formed along the inner circumferential surface of the main bearing 4 through a through-port formed in a wall of the main bearing 4 from an oil gallery formed in a cylinder block wall.

Furthermore, the first lubricating oil path 6a is formed to penetrate in the diameter direction of the journal section 6, and the opening at both ends of the first lubricating oil path 6a communicates with the lubricating oil groove 41a. A second lubricating oil path 5a that branches from the first lubricating oil path 6a of the journal section 6 and passes through a crank arm section (not illustrated) is formed, and the second lubricating oil path 5a communicates with a third lubricating oil path 5b that is formed to penetrate in a diameter direction of the crankpin 5.

In this manner, the lubricating oil passes through the first lubricating oil path 6a, the second lubricating oil path 5a and the third lubricating oil path 5b, and is supplied to a gap that is formed between the crankpin 5 and the connecting rod bearing 3, from a discharge port 5c at an end portion of the third lubricating oil path 5b.

(Configuration of Half Bearing)

Figure 2:
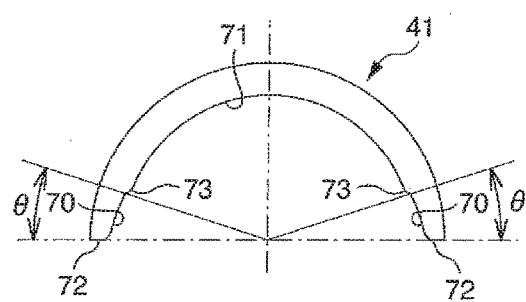
FIG. 2 is a front view of one half bearing according to an embodiment of the invention of the present application.
Figure 5:
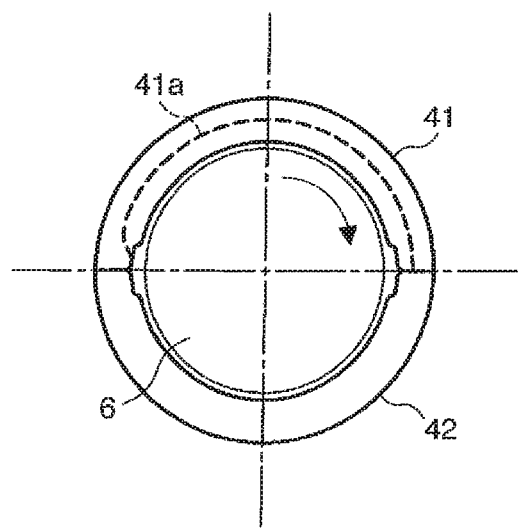
FIG. 5 is a front view of a main bearing in a state in which a pair of half bearings is assembled.

The main bearing 4 of the present embodiment is formed by butting end surfaces in a circumferential direction of the pair of half bearings 41 and 42, and assembling the pair of half bearings 41 and 42 into a cylindrical shape as a whole (see FIG. 5). Each half bearing 41 (42) is formed into a semi-cylindrical shape by a bimetal formed by bonding a bearing alloy thinly on a steel plate as shown in FIG. 2. The half bearing 41 includes a main cylinder portion 71 that is formed by including a central portion in a circumferential direction, crush relief portions 70 and 70 that are formed at both end portions in the circumferential direction, and transition regions 73 and 73 that are located between the main cylinder portion 71 and the crush relief portions 70 and 70, and are formed in such a manner that wall thicknesses thereof become thinner toward the crush relief portions 70 and 70.

(Embodiment 1)

Figure 3:
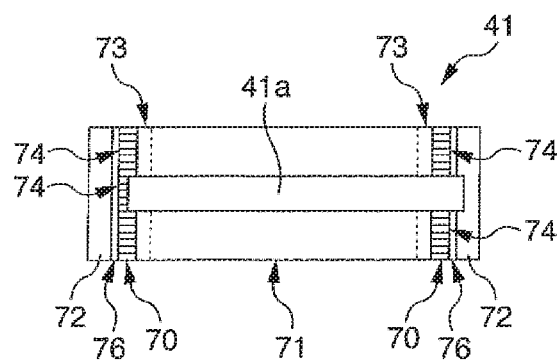
FIG. 3 is a bottom view of the one half bearing according to the embodiment of the invention of the present application.

As is understood from FIGS. 3 and 5, the oil groove 41a which is formed on the inner circumferential surface of the half bearing 41 is formed to extend through the central portion in the circumferential direction, so that a circumferential end portion of the oil groove 41a on a front side in the rotation direction of the crankshaft opens on an end surface 72 on the front side in the rotation direction of the crankshaft while a circumferential end portion of the oil groove 41a on a rear side in the rotation direction of the crankshaft is located in the crush relief portion 70 on the rear side in the rotation direction of the crankshaft.

In this embodiment, the oil groove 41a has a rectangular shape in cross-section. The depth of the oil groove 41a is constant in the circumferential direction except the vicinity of the circumferential end portion of the oil groove 41a on the rear side in the rotation direction of the crankshaft, and becomes gradually shallow in the vicinity of the circumferential end portion toward the circumferential end portion on the rear side in the rotation direction of the crankshaft. Note that in the main cylinder portion 71, the depth of the oil groove 41a mentioned here refers to a depth from an inner circumferential surface of the main cylinder portion 71 to an oil groove bottom surface in the radial direction, whereas in the crush relief portion 70 and the transition region 73, the depth of the oil groove 41a refers to a depth from a virtual inner circumferential surface 71v (see FIG. 7) in the case in which the crush relief portion 70 and the transition region 73 are not formed.

The reason why the oil groove 41a is configured to open on the circumferential end surface 72 of the half bearing 41 on the front side in the rotation direction of the crankshaft is to forward a large amount of oil to an inner circumferential surface of the other half bearing 42 to improve the lubrication property. Further, the reason why the circumferential end portion of the oil groove 41a on the rear side in the rotation direction of the crankshaft is configured to be located in the crush relief portion 70 on the rear side in the rotation direction of the crankshaft is to prevent shortage of the oil in the region of the circumferential end portion of the oil groove 41a on the rear side in the rotation direction of the crankshaft as described above.

As is understood from FIG. 3, the oil groove 41a is disposed in a center of a width in an axial direction of the half bearing 41. A through-port (not illustrated) that penetrates through the half bearing 41 in a radial direction is formed in a bottom portion of the oil groove 41a, and the oil is supplied into the oil groove 41a through the through-port from the oil gallery in the wall of the cylinder block. The width of the oil groove 41a varies depending on the specifications of the internal combustion engine, and in the case of a compact internal combustion engine for a passenger car, for example, is about 4 to 7 mm and a maximum depth (corresponding to the constant depth except the region of the circumferential end portion of the oil groove 41a on the rear side in the rotation direction of the crankshaft in the case of Embodiment 1) of the oil groove 41a is about 0.5 to 1.5 mm.

Note that the oil groove 41a is not limited to Embodiment 1, and the width and depth of the oil groove may be maximum in the vicinity of the center portion of the length of the oil groove 41a and may become small gradually toward the circumferential end portion.

Note that in the invention of the present application, the transition region 73 on a front side in the rotational direction of the crankshaft, of the half bearing 41 on an upper side is an essential component while the transition region 73 on a rear side is not an essential component, and that the transition region 73 on the rear side in the rotation direction of the crankshaft, of the half bearing 42 on the lower side is an essential component while the transition region 73 on the front side are not essential components.

In Embodiment 1, the half bearings 41 and 42 include the transition regions 73 and 73 on both of the front side and the rear side. Unlike Embodiment 1, on the rear side in the rotational direction of the crankshaft 6, of the half bearing 41, the crush relief portion 70 and the main cylinder portion 71 may be formed to be directly connected, without forming the transition region 73. Further, without forming the transition region 73 on the front side in the rotational direction of the crankshaft 6 in the half bearing 42 on the lower side, the crush relief portion 70 and the main cylinder portion 71 may be formed to be directly connected. Note that "the transition region 73 on the front side in the rotation direction of the crankshaft 6" means the transition region 73 which an optional point on a surface of the journal section 6 which is rotating passes at the second time, out of the transition regions 73 located in the vicinities of both ends when attention is paid to the one half bearing 41 or 42.

Meanwhile, a crankshaft of an internal combustion engine rotates in one direction during operation. Accordingly, a person skilled in the art would be able to recognize which of two crush reliefs adjacent to circumferential end surfaces of a half bearing corresponds to the "transition region on the front side in the rotation direction of the crankshaft" taking account of the rotation direction of the crankshaft. Also, the skilled person would be able to design and manufacture the main bearing 4 of the present invention in accordance with the disclosure of the invention, and to mount this bearing in a bearing device which supports the crankshaft rotating in one direction.

If the transition regions 73 are formed on both the front side and the rear side in the rotation direction of the crankshaft in the half bearing 41, commonality of machining steps for the inner circumferential surface at both end portions in the circumferential direction of the half bearing 41 can be achieved, and if the transition regions 73 are formed in the half bearing 42, commonality of machining steps for the inner circumferential surfaces of the half bearing 41 and the half bearing 42 can be also achieved.

Figure 6:
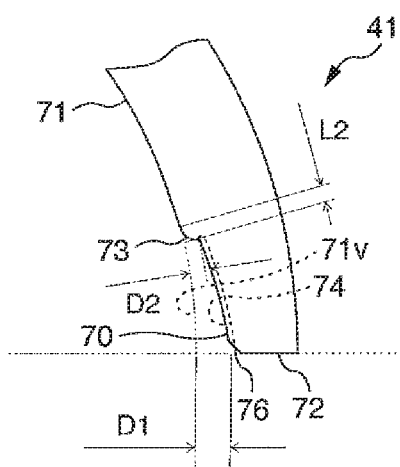
FIG. 6 is an enlarged front view explaining a shape in a vicinity of a crush relief.
Figure 7:
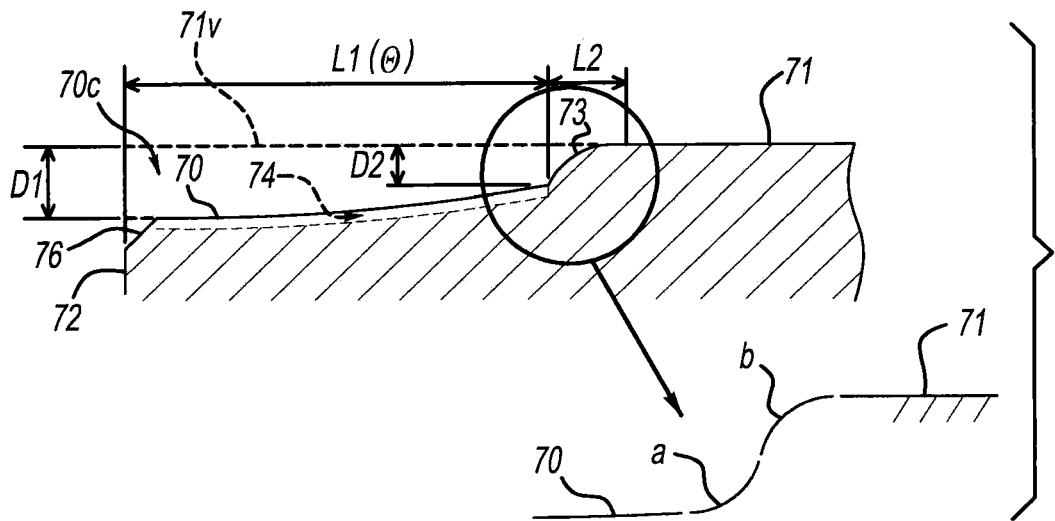
FIG. 7 is a development explaining specific dimensions by developing a main cylinder portion in a planar fashion in regard with the shape in the vicinity of the crush relief.

The main cylinder portion 71 has a semi-cylindrical surface that occupies most part of the inner circumferential surface of the half bearing 41 (or 42), and the semi-cylindrical surface forms a main sliding surface between the semi-cylindrical surface and a mating shaft. The transition region 73 which has a wall thickness gradually decreasing toward the crush relief portion 70 is provided adjacently to the main cylinder portion 71, as shown in FIGS. 6 and 7. In other words, in the transition region 73, an inclined curved surface is formed to approach the mating shaft side from an inner surface of the crush relief portion 70 toward an inner surface of the main cylinder portion 71.

The transition region 73 seen from the axial direction of the half bearing 41 (or 42) is made of an inward protruding curved surface that protrudes inward in a radial direction of the half bearing 41 (or 42). Namely, an inclination of the inclined curved surface of the transition region 73 to the virtual inner circumferential surface (extended surface of the main cylinder portion 71) 71v of the half bearing 41 seen from the axial direction of the half bearing 41 (or 42) becomes the largest at a position connecting to the crush relief portion 70, and becomes the smallest at a position connecting to the main cylinder portion 71, and the transition region 73 connects to the main cylinder portion 71 smoothly.

Note that the transition region may be formed of a flat surface, and in that case, a corner portion (a corner edge portion) is formed at a connection spot of the main cylinder portion 71 and the transition region. The corner portion contacts a journal portion surface of the crankshaft, and damage easily occurs. The transition region is formed by the inclined curved surface as in the invention of the present application, whereby such a problem hardly arises.

Note that, an inner surface shape of the transition region 73 in a connecting portion of the transition region 73 and the oil groove 41a can be such a shape that the foreign matters in the oil groove flow to a relief gap (a gap formed by the inner surface of the transition region 73, the inner surface of the crush relief portion 70 and the virtual inner circumferential surface). For example, the inner surface shape may include an outward protruding curved surface that protrudes to an outer diameter side, or may be a composite curved surface in an S-shape having an outward protruding curved surface on a side near to the crush relief portion 70 and an inward protruded curved surface on a side far from the crush relief portion 70. As such, with reference to the detailed enlarged view of the designated portion of FIG. 7, the portion designated as "a" corresponds to the outward protruding curved surface, while the portion designated as "b" corresponds to the inward protruding curved surface.

Next, with reference to FIG. 7, specific dimensions of the crush relief portion 70 and the transition region 73 will be described. FIG. 7 is a development in which the inner circumferential surface of the main cylinder portion 71 is developed to be a flat surface (a straight line in a section).

A depth D1 at the circumferential end surface of a crush relief 70c may be similar to the conventional crush relief. Though the depth D1 depends on the specifications of an internal combustion engine, the depth D1 is about 0.01 to 0.05 mm, for example, in the case of a compact internal combustion engine bearing for a passenger car. Further, the crush relief 70c is preferably formed from the end portion in the circumferential direction of the half bearing to a range of a circumferential angle θ of 3° to 15° inclusive toward a central portion side in the circumferential direction, for an discharge operation of the foreign matters to the relief gap from the oil groove 41a (see FIGS. 2 and 7).

Figure 10A:
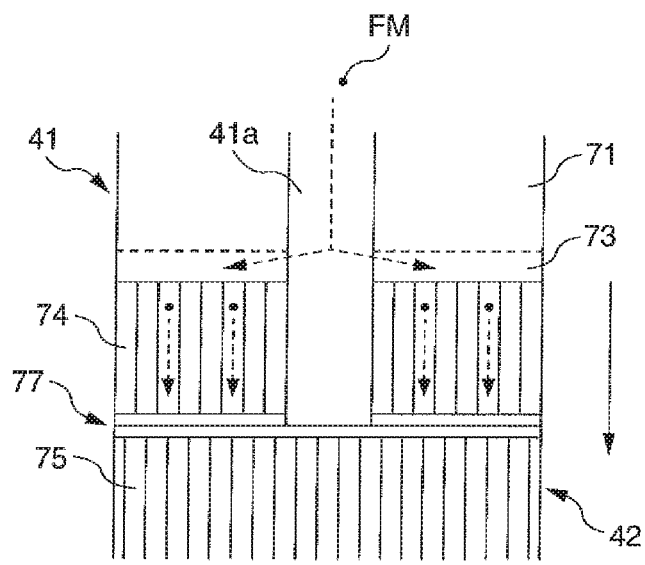
FIG. 10A is a view seen from a bearing inner side for explaining an operation of the main bearing of the invention of the present application.

A depth D2 at a position of the crush relief portion 70 connecting to the transition region 73 can be set at 0.002 to 0.030 mm. If the depth D2 is within this range, (A) in the upstream side region of the crush relief, a gap space in which the foreign matter FM in the oil groove is movable to the relief gap is also formed in a vicinity of the connecting portion of the transition region 73 and the oil groove 41a (FIG. 10B), and (B) the oil in the relief gap between the surface of the journal section 6 of the crankshaft and the inner surface of the crush relief portion 70 also reduces in pressure in the upstream region, whereby the foreign matters in the oil groove also disperse and flow especially to the relief gap from a gap between the transition region and the journal surface together with the lubricating oil (FIG. 10A).

Note that when the depth D2 is less than 0.002 mm, the gap for the foreign matters in the oil groove to pass becomes too small, and the effect of reducing the pressure of the oil in the relief gap also reduces. Therefore, the foreign matters in the oil groove are difficult to disperse and feed to the relief gap. Further, when the depth D2 exceeds 0.030 mm, a gap (a gap sandwiched by the inner surface of the crush relief portion 70 and the virtual inner circumferential surface 71v) of the crush relief 70c in the end portion in the width direction of the half bearing 41 (or 42) is large, and therefore, a leakage amount of the lubricating oil to the outside from both end portions in the bearing width direction of the half bearing 41 (or 42) becomes large.

A length L2 in the circumferential direction, of the transition region 73 according to Embodiment 1 is in a range of 1 to 4 mm, and is more preferably in a range of 2 to 3 mm.

The crush relief portion 70 is a wall thickness decreasing region that is formed in each of regions adjacent to the end surfaces 72 (see FIG. 5) in the circumferential direction of the half bearings 41 and 42 in such a manner that a wall thickness becomes thinner than the main cylinder portion 71. The crush relief portions 70 are provided with an objective of forming crush reliefs 70c that absorb positional displacement and deformation of butting end surfaces (the end surfaces 72 in the circumferential direction) in a state in which the pair of half bearings 41 and 42 are assembled to a cylinder block lower part 81 and a bearing cap 82 (for example, see SAE J506 (item 3.26 and item 6.4), DIN1497 (section 3.2), JIS D3102).

The crush relief portion 70 according to Embodiment 1 is formed in such a manner that the depth D1 at the position of the end surface 72 becomes deeper than the depth D2 at the position connecting to the transition region 73 as shown in FIGS. 6 and 7. Here, the depth of the crush relief 70c refers to a distance from the virtual inner circumferential surface 71v which is obtained by extending the inner circumferential surface of the main cylinder portion 71 over the crush relief portion 70 to the surface of the crush relief portion 70.

Furthermore, the inner surface of the crush relief portion 70 according to the present embodiment is formed by an outward protruding curved surface in an outward protruding shape in the radial direction of each of the half bearings 41 and 42. Namely, an inclination of the inner surface of the crush relief portion 70 with respect to the virtual inner circumferential surface 71v of the half bearings 41 and 42 when seen from the axial direction of the half bearing 41 is maximum at the position connecting to the transition region 73, is minimum at the position of the end surface 72, and is substantially parallel with the virtual inner circumferential surface 71v.

Note that shapes of the main cylinder portion 71, the crush relief portion 70 and the transition region 73 that are described above are measurable by an ordinary shape measuring instrument, for example, a roundness measuring instrument. Namely, in a state in which the bearing is assembled into the actual bearing housing section at the cylinder block lower part, or the housing similar thereto, the shape of the inner surface of the bearing can be measured continuously in the circumferential direction.

Figure 4:
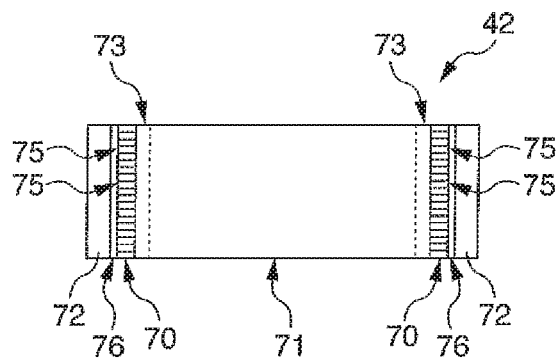
FIG. 4 is a bottom view of the other half bearing according to the embodiment of the invention of the present application.

In the crush relief portions 70, a plurality of crush relief grooves 74 and 75 are formed throughout an entire length in the circumferential direction of the inner circumferential surfaces of the crush relief portions 70 to extend parallel with the circumferential direction of the bearing, as shown in FIGS. 3 and 4. The plurality of crush relief grooves 74 and 75 are disposed parallel with one another in the width direction of the half bearings 41 and 42, and are formed throughout the entire width. Accordingly, a flat region is not present on the inner circumferential surfaces of the crush relief portions (except for a formation range of the oil groove 41a of the half bearing 41). Further, all of the plurality of crush relief grooves 74 and 75 are formed into the same groove widths and groove depths, and are also formed into the same groove widths and groove depths throughout the entire length in the circumferential direction of the circumferential surface of the crush relief portion 70.

Figure 8:
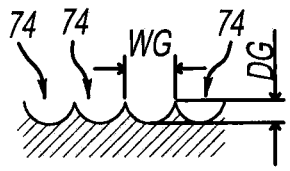
FIG. 8 is a sectional view of crush relief grooves.

Describing in more detail, the crush relief groove 74 is formed into a circular-arc shape (a shape in which a circular-arc portion is on a back side) with a predetermined groove width WG and a predetermined groove depth DG, as shown in FIG. 8. In other words, the individual crush relief grooves 74 are cut grooves each in a U-shape, provided in parallel at constant intervals (WG) in the width direction, and form a section in a saw-tooth shape or a shallow comb shape as a whole. Here, the groove width WG refers to the distance in the width direction of the half bearings 41 and 42 between apexes of adjacent peak portions, and the groove depth DG refers to a distance in a direction perpendicular to the inner circumferential surface from the apex to a bottom point of a valley portion. More specifically, the crush relief groove 74 preferably has the groove width WG of 0.05 to 0.5 mm, and the groove depth DG of 1 to 20 μm.

Here, the crush relief portions 70 are configured so that the plurality of crush relief grooves 74, 75 are formed on the inner circumferential surfaces thereof, however, the crush relief grooves 74, 75 are not formed continuously in the transition regions 73 as shown in FIG. 7, and thus a boundary between the crush relief 70 and the transition region 73 is clear.

Figure 13A:
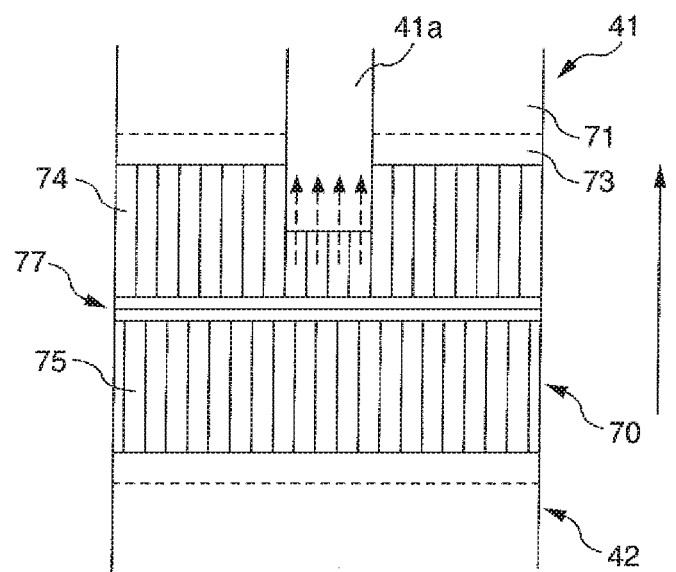
FIG. 13A is a view seen from a bearing inner side for explaining an operation of the main bearing of the invention of the present application.
Figure 13B:
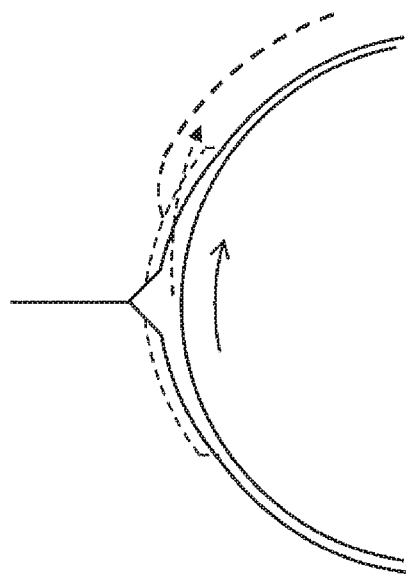
FIG. 13B is a front view for explaining the operation of the main bearing of the invention of the present application.
Figure 14A:
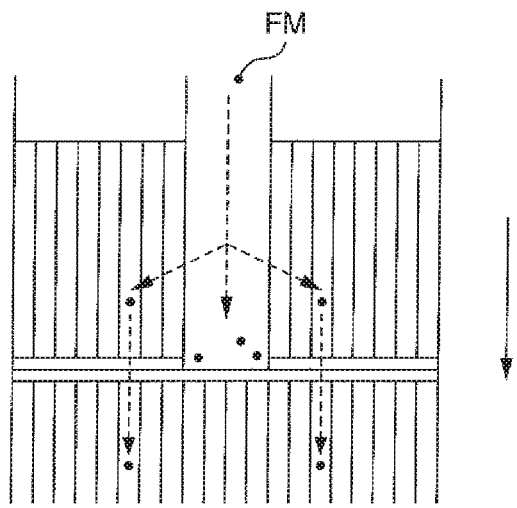
FIG. 14A is a view seen from a bearing inner side explaining an operation of a main bearing of a prior art.
Figure 14B:
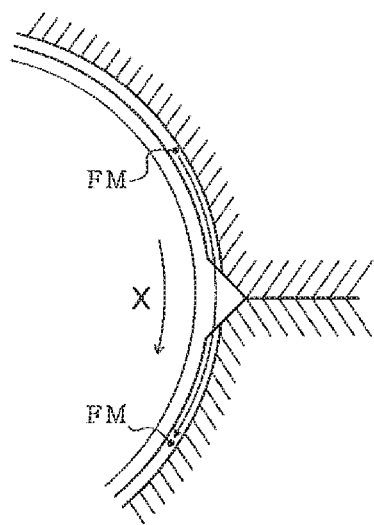
FIG. 14B is a front view explaining the operation of the main bearing of the prior art.

According to the invention of the present application, as shown in FIGS. 10A and 13A, the plurality of crush relief grooves 74 are formed throughout the entire length in the circumferential direction of the inner circumferential surface of the crush relief portion 70 to extend parallel with the circumferential direction of the bearing. When among the crush relief grooves 74 of the half bearing 41 on the upper side of FIG. 10A, for example, the crush relief grooves 74 on the right side of the page from the oil groove 41a and the crush relief grooves on the left side of the page are inclined toward the central portion (the oil groove 41a) in the axial direction of the half bearing 41 (inclined with respect to the circumferential direction of the bearing), instead of the circumferential direction, unlike the invention of the present application, foreign matters discharged into the relief gap are fed again toward the central portion (the oil groove 41a side) in the axial direction of the half bearing, and therefore, are difficult to discharge to an outside of the bearing. Further, for example, when among the crush relief grooves 74 of the half bearing 41 on the upper side in FIG. 10A, the crush relief grooves 74 on the right side on the page from the oil groove 41a and the crush relief grooves on the left side on the page are inclined toward the end portion in the axial direction of the half bearing 41, the leakage amount of the oil to the outside from the half bearing 41 becomes large.

Furthermore, as shown in FIGS. 3, 4, 6, 7 and 9, in the crush relief portions 70, inclined surfaces 76 that continuously extend in the axial direction of the half bearings 41 and 42 are formed at inner end edges in the circumferential direction of the half bearings 41 and 42. Namely, an axial groove 77 is formed along inner edges of the circumferential end surfaces 72 that abut on each other, and throughout the entire length of the width in the axial direction of the main bearing, in a state in which the pair of half bearings 41 and 42 are combined into a cylindrical shape. Note that unlike Embodiment 1, the inclined surface 76 may be formed on only one end surface in the circumferential direction out of the two circumferential end surfaces 72 which abut on each other. In that case, when the pair of half bearings 41 and 42 is combined into the cylindrical shape, the inclined surface 76 forms the axial groove 77 in cooperation with the other circumferential end surface 72.

Figure 9:
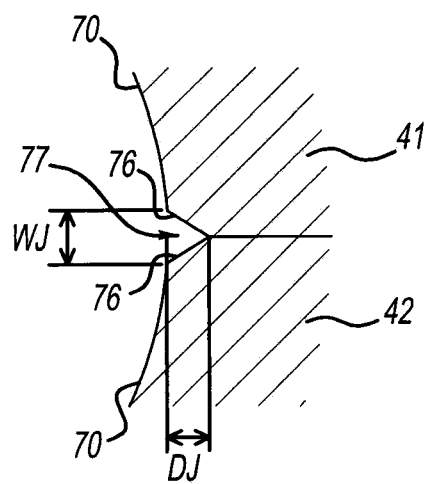
FIG. 9 is a sectional view of an axial groove.

More specifically, the axial groove 77 preferably has a groove width WJ of 0.3 to 2 mm in the circumferential direction in the combined state, and a groove depth DJ in the radial direction of 0.1 to 1 mm. Dimensions of the axial groove 77 to be a discharge path for foreign matters can be decided with the sizes of the foreign matters entering the lubricating oil taken into consideration, and are not influenced by the size of the bearing. Note that FIG. 9 shows the groove with a V-shaped section as the axial groove 77, but the sectional shape is not limited thereto as long as foreign matters can be discharged.

The axial groove 77 is formed to be deeper than the crush relief groove 74. Therefore, an opening of the crush relief groove 74 at the end portion in the circumferential direction opens to an inner surface (the inclined surface 76) of the axial groove 77. Therefore, the lubricating oil and the foreign matters which flow by being guided by the inner surface recessed portion of the crush relief groove 74 directly advances into the axial groove 77, and therefore, an oil flow to the axial direction is easily formed in the axial groove 77. Accordingly, the foreign matters that advance into the axial groove 77 together with the lubricating oil are easily discharged outside the bearing.

Figure 10B:
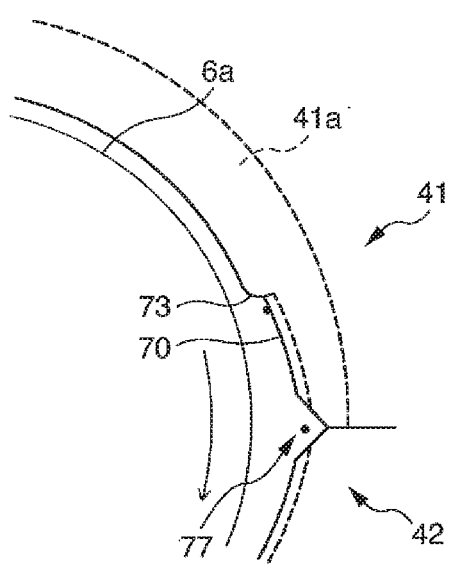
FIG. 10B is a front view for explaining the operation of the main bearing of the invention of the present application.

Incidentally, as shown in FIGS. 10A and 10B, some of the foreign matters FM that are discharged to the relief gap of the one half bearing 41 from the oil groove 41a sometimes pass over the axial groove 77 and advance into the relief gap of the other half bearing 42. Therefore, the crush relief grooves 74 and 75 are preferably disposed as follows.

Figure 11:
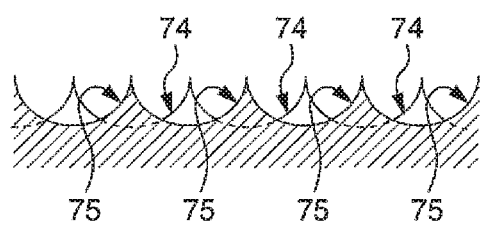
FIG. 11 is an explanatory view explaining positional relationship of paired crush relief grooves.

In the crush relief portion 70 of the other half bearing 42 which is paired with the one half bearing 41, the plurality of crush relief grooves 75 that continue in the circumferential direction are provided. In the present embodiment, as shown in FIG. 11, the plurality of crush relief grooves 74 of the one half bearing 41 of the present embodiment are each displaced by a half of the groove width WG in the width direction, with respect to the plurality of crush relief grooves 75 of the other half bearing 42. Namely, in the butting portions of the circumferential end surfaces of the pair of half bearings 41 and 42, that is, a connecting position of the one crush relief groove 74 and the other crush relief groove 75 (actually are not directly connected because the axial groove 76 is present), the valley portion (an opening in a recessed shape of the crush relief groove) of the one crush relief groove 74 is disposed to correspond to the peak portion (the protruded shape formed between the two adjacent circumferential grooves 74) of the other crush relief groove 75.

Accordingly, since the foreign matters receive resistance in the connecting position of the crush relief groove 74 and the crush relief groove 75, the foreign matters that flow in the crush relief groove 74 of the one half bearing 41 hardly advance into the crush relief groove 75 of the other half bearing 42, and are easily discharged to the outside of the bearing by the oil flow that flows to the end portion side in the bearing width direction in the axial groove 77 at the same time. Note that the oil also receives resistance in the connecting position of the crush relief groove 74 and the crush relief groove 75, and also flows from the crush relief groove 74 to the crush relief groove 75.

Further, since the second half bearing 42 further includes the transition region 73 formed between the crush relief portion 70 on the rear side in the rotation direction of the crankshaft and the main cylinder portion 71 so that its wall thickness becomes thinner toward the crush relief portion 70 from the main cylinder portion 71, which transition region 73 has an inward protruding curved surface in a protruding shape protruding inward in a radial direction seen from the axial direction of the half bearing 42, a retaining capacity for the oil flowing from the oil groove 41a of the first half bearing 41 becomes large as compared to a relief gap formed by a conventional crush relief portion. Accordingly, the oil in the crush relief gap of the crush relief portion 70 is forwarded toward the crankpin portion side when the inlet opening 6c of the inner oil path 6a of the crankshaft 6 communicates with this crush relief 70 (as well as the oil groove 41), which hardly causes the intermittent oil supply.

Figure 15:
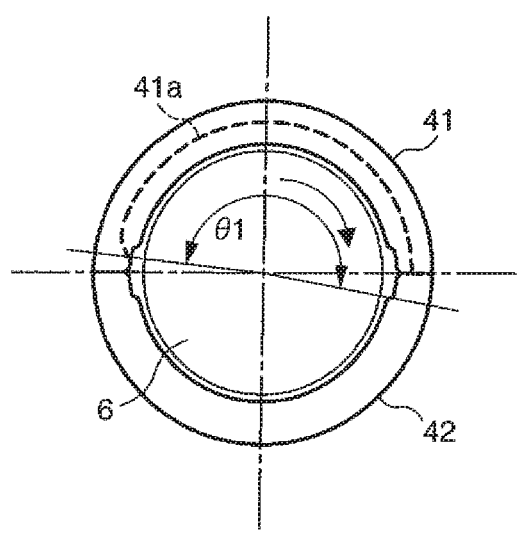
FIG. 15 is a front view of a main bearing in a state in which a pair of half bearings is assembled.

Further, in the case that a range (θ1) obtained by combining a formation range of the oil groove 41a of the first half bearing 41 and a formation range of the crush relief portion 70 of the second half bearing 42 on the rear side in the rotation direction of the crankshaft 6 is from 180° to 190° as a circumferential angle as shown in FIG. 15, any one of two openings of the inner oil path 6a of the crankshaft 6 always communicates with the oil groove 41a or the relief gap of the crush relief portion 70 of the second half bearing 42 on the rear side in the rotation direction of the crankshaft 6, and therefore the oil is always supplied to the crankpin portion 5 side. Note that if the range (θ1) obtained by combining the formation range of the oil groove 41a of the first half bearing 41 and the formation range of the crush relief portion 70 of the second half bearing 42 on the rear side in the rotation direction of the crankshaft 6 is more than 190° as a circumferential angle, it becomes necessary to increase the pressure of the oil supplied to the main bearing 4 or increase the amount of the supplied oil, which requires increase in size of the oil pump and deteriorates fuel consumption of the internal combustion engine.

(Embodiment 2)

Figure 12:
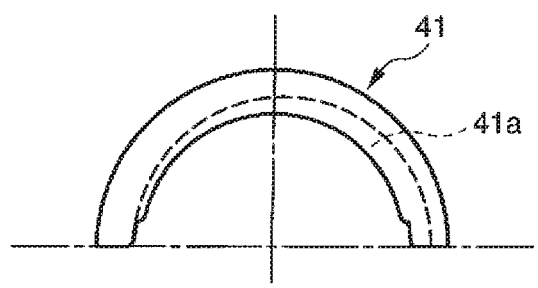
FIG. 12 is a front view of one half bearing according to another embodiment of the invention of the present application.

In Embodiment 2, unlike the one half bearing 41 of Embodiment 1, the oil groove 41a is formed in such a manner that its depth from the main cylinder surface is maximum at the circumferential end surface 72 of the half bearing 41 on the front side in the rotation direction of the crankshaft, and becomes gradually smaller toward the circumferential end portion on the rear side in the rotation direction of the crankshaft, as shown in FIG. 12. Note that the depth of the oil groove 41a at the circumferential end surface 72 on the front side in the rotation direction of the crankshaft refers to a depth to a bottom surface of the oil groove 41a from a virtual main cylinder surface 71 (namely, a virtual inner circumferential surface 71v) obtained in the case in which the crush relief portion 70 and the inclined surface 76 are not formed. The circumferential end portion of the oil groove 41a on the rear side in the rotation direction of the crankshaft is positioned in the crush relief portion 70, and there is formed a surface of the crush relief portion 70 having a plurality of crush relief grooves on a front side from the circumferential end portion of the oil groove 41a. The other configuration is the same as the configuration of the half bearing 41 of Embodiment 1.

Also in Embodiment 2, a plurality of crush relief grooves 75 extending in the circumferential direction are provided in the crush relief portion 70 of the other half bearing 42 which is paired with the one half bearing 41 in the same manner as Embodiment 1. The plurality of crush relief grooves 74 on the circumferential front side of the oil groove 41a of the one half bearing 41 of the present embodiment are each displaced by a half of the groove width WG in the width direction, with respect to the plurality of crush relief grooves 75 of the other half bearing 42. Therefore, the foreign matters that remain in the oil groove 41a and flow in the crush relief grooves 74 of the one half bearing 41 hardly advance into the crush relief grooves 75 of the other half bearing 42, and are easily discharged to the outside of the bearing by the flow of the oil that flows to the end portion side in the bearing width direction in the axial groove 77.

While each of Embodiment 1 and Embodiment 2 shows the example in which the plurality of crush relief grooves 74 of the one half bearing 41 are each displaced by a half of the groove width WG in the width direction with respect to the plurality of crush relief grooves 75 of the other half bearing 42, the invention of the present application is not limited thereto. The plurality of crush relief grooves 74 may be displaced within a range that exceeds zero and is less than the groove width WG in the width direction, with respect to the plurality of crush relief grooves 75 of the other half bearing 42. In other words, the crush relief groove 74 on one side and the crush relief groove 75 on the other side can be disposed by the positions of the respective central portions in the groove widths are displaced in the width direction in a range which exceeds at least zero and is less than the groove width WG at the maximum in the connecting position. Further, more preferably, the crush relief groove 74 on the one side and the crush relief groove 75 on the other side are disposed in such a manner that the respective positions of the central portions in the groove widths are displaced in the width direction of the half bearing 41 in a range of at least 10% of the groove width WG to 50% inclusive of the groove width WG at the maximum in the connecting position. However, the crush relief groove 74 and the crush relief groove 75 may conform to each other, though discharge performance for foreign matters is slightly low.

While the embodiments of the invention of the present application are described in detail with reference to the drawing, the specific configuration is not limited to the embodiments, and design changes to the extent without departing from the gist of the invention of the present application are included in the invention of the present application.

For example, in each of the embodiments, the case in which the plurality of crush relief grooves 74 are provided at only the crush relief portion 70 is described, but a plurality of circumferential grooves may be provided in the main cylinder surface. Further, a plurality of circumferential grooves may be provided in the transition region 73. However, the circumferential grooves formed in the main cylinder surface and the transition region 73 should have a smaller groove depth than the crush relief grooves 74, 75, and the crush relief grooves 74, 75 should not be formed so as to extend up to the transition region 73 and the main cylinder surface. Further, the oil groove 41a has a rectangular shape in cross-section in the embodiments, but may have an inversed trapezoidal shape in cross-section. Furthermore, a region where the bearing wall thickness decreases (a crowning portion) may be provided on the inner circumferential surface sides of both the end portions in the axial direction of the half bearings 41 and 42. Further, although the embodiments show the example in which the main bearing 4 supports the crankshaft with two inlet openings 6c for the inner oil path 6a on the surface of the journal section 6, the present invention is not limited to this, and may be applied to a main bearing 4 which supports a crankshaft with one opening, or with three or more openings for a lubricating oil path 6a on a surface of a journal section 6.

The invention claimed is:

1. A main bearing for rotatably supporting a journal section of a crankshaft of an internal combustion engine, the journal section including a cylindrical body portion, a lubricating oil path extending to penetrate the cylindrical body portion, and at least one inlet opening of the lubricating oil path that is formed on an outer peripheral surface of the cylindrical body portion, the main bearing comprising
a first half bearing and a second half bearing which are adapted to be combined in a cylindrical shape by butting circumferential end surfaces of the respective half bearings,
the first and second half bearings are configured so as to form together an axial groove extending through an entire length of the main bearing in an axial direction on an inner circumferential side of each of the circumferential end surfaces when the first and second half bearings are combined,
each half bearing comprises a main cylinder portion including a circumferential central portion and circumferential end portions of the half bearing, and crush relief portions which are formed over the entire length in the axial direction at both circumferential end portions of the half bearing so that a wall thickness of the crush relief portion is thinner than that of the main cylinder portion, and each crush relief portion extending from the circumferential end surface toward the circumferential central portion of the half bearing with a center angle not less than 3° but not more than 15°,
a plurality of crush relief grooves extending in the circumferential direction over an entire length of the crush relief portion are formed in each crush relief portion so as to communicate with the axial groove,
an oil groove is formed only on an inner circumferential surface of the first one of the first and second half bearings to extend in the circumferential direction at least over the main cylinder portion of the first half bearing, a circumferential end portion of the oil groove on a front side of a rotation direction of the crankshaft opens on the circumferential end surface of the first half bearing on the front side of the rotation direction, a circumferential end portion of the oil groove on a rear side of the rotation direction of the crankshaft is located in the crush relief portion of the first half bearing on the rear side of the rotation direction, the first half bearing further comprises a transition region formed at least between the crush relief portion on the front side in the rotation direction of the crankshaft and the main cylinder portion so that a wall thickness of the transition region becomes thinner toward the crush relief portion from the main cylinder portion,
the second half bearing further comprises a transition region formed at least between the crush relief portion on the rear side in the rotation direction of the crankshaft and the main cylinder portion so that a wall thickness of the transition region becomes thinner toward the crush relief portion from the main cylinder portion, and
each of the transition regions comprises an inwardly curved surface which extends inward in a radial direction, seen from the axial direction of the half bearing.

2. The main bearing according to claim 1, wherein each crush relief portion connecting with the transition region has a depth of 0.002 mm to 0.030 mm in a radial direction at the connecting position.

3. The main bearing according to claim 1, wherein each transition region has a length of 1 mm to 4 mm in the circumferential direction.

4. The main bearing according to claim 1, wherein each crush relief groove has a depth of 1 μm to 20 μm in the radial direction, and a width of 0.05 mm to 0.5 mm in the axial direction.

5. The main bearing according to claim 1, wherein when the first and second half bearings are combined, the respective crush relief grooves formed in the crush relief portions of the first half bearing are adapted to be displaced in the axial direction with respect to the respective crush relief grooves formed in the crush relief portions of the second half bearing by an amount exceeding zero at a minimum and less than the width of the crush relief groove at a maximum.

6. The main bearing according to claim 1, wherein each axial groove has a depth of 0.1 mm to 1 mm in the radial direction, and a width of 0.3 mm to 2.0 mm in the circumferential direction.

7. The main bearing according to claim 1, wherein each transition region has the inwardly curved surface and an outwardly curved surface which extends outward in the radial direction, the inwardly curved surface being farther from the crush relief portion than the outwardly curved surface.

8. The main bearing according to claim 1, wherein the depth of the oil groove is maximum at the circumferential end surface of the first half bearing on the front side of the rotation direction, and becomes smaller toward the circumferential end portion of the oil groove on the rear side of the rotation direction.

9. The main bearing according to claim 1, wherein a range obtained by combining a formation range of the oil groove of the first half bearing and a formation range of the crush relief portion of the second half bearing on the rear side of the rotation direction is from 180° to 190° as a circumferential angle.

* * * * *